United States Patent
Beach

(10) Patent No.: US 6,327,989 B1
(45) Date of Patent: Dec. 11, 2001

(54) BOAT FENDER BRACKET FOR A ROUND PILING

(76) Inventor: Edwin Roy Beach, 5383 Stonybrook Dr., Boynton Beach, FL (US) 33437

(*) Notice: Subject to any disclaimer, the term of this patent is extended or adjusted under 35 U.S.C. 154(b) by 0 days.

(21) Appl. No.: 09/846,327

(22) Filed: Feb. 26, 2001

(51) Int. Cl.[7] .................................... B63B 59/02
(52) U.S. Cl. ........................... 114/219; 405/212
(58) Field of Search ............................ 114/219; 405/212, 405/215

(56) References Cited

U.S. PATENT DOCUMENTS

| | | |
|---|---|---|
| 2,926,904 | 3/1960 | Erlbacher . |
| 3,145,685 | 8/1964 | Kulick, Sr. . |
| 3,616,126 | 10/1971 | Tungseth . |
| 3,863,589 | 2/1975 | Buienne et al. . |
| 3,950,953 | 4/1976 | Matthews . |
| 3,975,916 | 8/1976 | Watson . |
| 4,267,792 | 5/1981 | Kimura et al. . |
| 4,554,882 | 11/1985 | Lemmens . |
| 4,641,999 | 2/1987 | Korbuly . |
| 4,650,371 | 3/1987 | Sawaragi et al. . |
| 4,773,349 | 9/1988 | McKinney . |
| 4,917,039 | 4/1990 | Siero . |
| 4,964,760 | 10/1990 | Hartman . |
| 5,018,471 | * 5/1991 | Stevens ................................. 114/219 |
| 5,037,242 | 8/1991 | Nill . |
| 5,562,364 | 10/1996 | Darder-Alomar . |

* cited by examiner

Primary Examiner—Ed Swinehart
(74) Attorney, Agent, or Firm—Dennis G. LaPointe; Mason & Associates, PA

(57) ABSTRACT

A fender bracket for a round piling includes two elongate piling bracket members, each having a generally concave-shaped longitudinal side and a generally flat side forming an acute angle with the concave-shaped longitudinal side. The fender bracket is secured to the round piling and the at least one bumper guard support member is secured to the elongate piling bracket members from the water side of the dock. At least one bumper guard is secured to the bumper guard support member in a longitudinal orientation generally parallel to a water surface. The fender bracket is secured to the round piling in such a manner as to be easily detachable for portability.

11 Claims, 3 Drawing Sheets

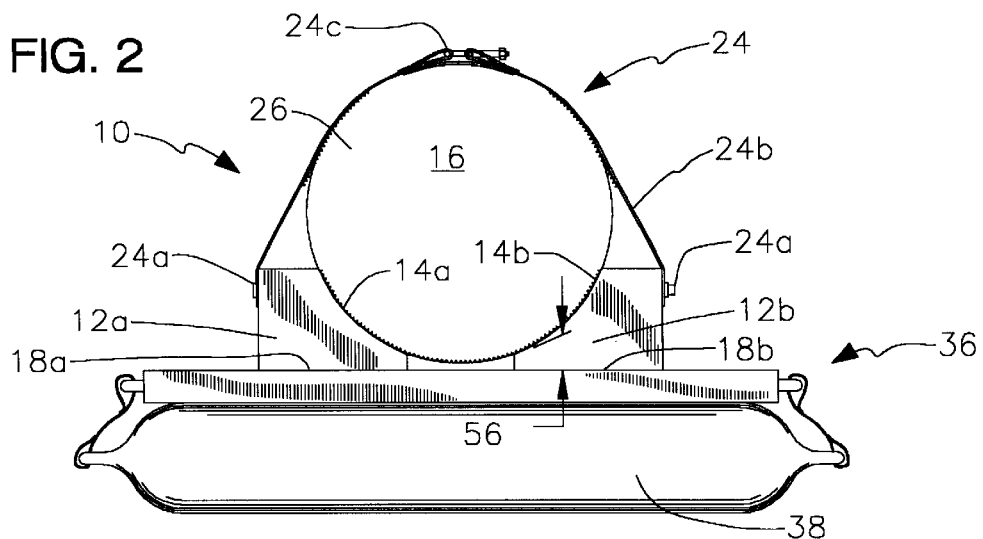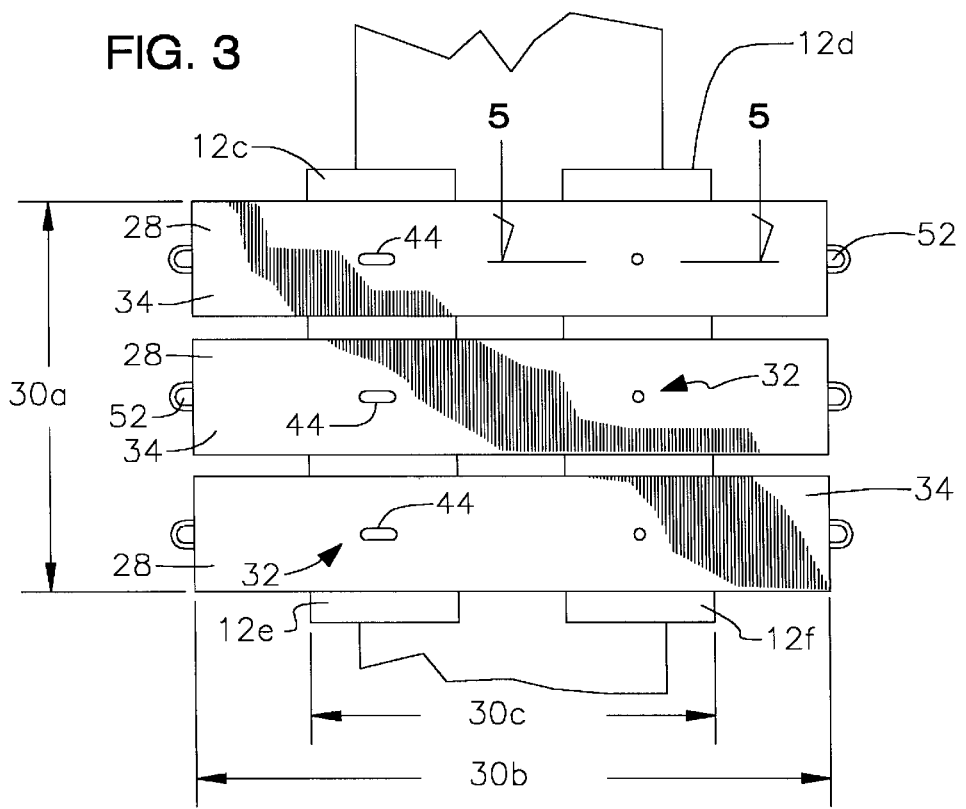

BOAT FENDER BRACKET FOR A ROUND PILING

BACKGROUND OF THE INVENTION

1. Field of the Invention

The invention relates to boat fender brackets adapted for use on round pilings at boat docks for protecting a boat at a dock.

2. Description of Related Art

Dock bumper guard systems are known in the art. However, many have bumper guards that bolt directly into the dock itself thereby making the system permanent to a specific dock location. Other prior art devices, incorporate complex shock system between plates mounted to the dock side.

The most common and simplest method used by many boat owners is to purchase and bumper guards, which generally are elongate and cylindrically shaped and to tie the bumper guards to their dock posts which can be flat boards or rounded pilings. However, there are disadvantages to these types of installation. When a bumper guard is placed on a flat board, it is usually a 2x6 board for which the bumper guard is installed in a vertical orientation. Over time, the single bumper guard tends to want to rotate toward the edges of the board thereby subjecting the boat to possible damage if it comes in contact with the dock or post edge. When a bumper guard is placed on a rounded piling, again the bumper guard tends to rotate around the circumference of the piling thereby exposing the boat to contact with the piling or dock itself.

Known related art includes permanent installations such as that depicted in U.S. Pat. No. 4,964,760 to Hartman, U.S. Pat. No. 3,975,916 to Watson, U.S. Pat. No. 4,773,349 to McKinney, U.S. Pat. No. 3,950,953 to Matthews, and U.S. Pat. No. 2,926,904 to Erlbacher. Other known related shock absorbing systems include U.S. Pat. No. 4,650,371 to Sawaragi et al.

None of the devices in the above references solve the problem of providing a non-cumbersome, relatively light weight portable fender bracket for use with bumper guards, on dock pilings, which are useful both for commercial boats as well as for private recreational boats.

SUMMARY OF THE INVENTION

The present invention is a fender bracket for a round piling. The fender bracket includes two elongate piling bracket members of predetermined length, each elongate piling bracket member having a generally concave-shaped longitudinal side for maintaining a generally contiguous face to face relationship along a length of a round piling.

Each elongate piling bracket member has a generally flat side forming an acute angle with the generally concave-shaped longitudinal side such that when the generally concave-shaped longitudinal side for each elongate piling bracket member is placed on the round piling, the generally flat side for each elongate piling bracket member substantially align with each other and a dock's edge and face away from said dock's edge.

Means for securing the elongate piling bracket members to the round piling are provided. The means for securing the elongate piling bracket members to the round piling typically has means proximate each end of the elongate piling bracket members for securing band means extending from each end of one of the elongate piling bracket members around a backside of the round piling to a corresponding opposite end of the other elongate piling bracket member. The band means is preferably a serrated band for providing a rotational frictional resistance against the surface of the round piling.

The present invention also includes at least one bumper guard support member of predetermined height and of predetermined width at least equal to a combined width of the round piling and the two elongate piling bracket members when assembled to the piling. The at least one bumper guard support member further has means for securing the at least one bumper guard support member to each of the elongate piling bracket members.

The at least one bumper guard support member has a generally planar surface such that when the at least one bumper guard support member is attached to the elongate piling bracket members, the generally planar surface substantially aligns with the dock's edge and faces away from said dock's edge.

Means for securing at least one bumper guard to the generally planar surface, in a longitudinal orientation generally parallel to a water surface is also provided. Typically, apertures or eyelets are incorporated at or near the ends of the bumper guard support members so that the bumper guards may be tied to the support members.

The generally concave-shaped longitudinal side for each of the elongate piling bracket members may have means for gripping the round piling, such as a ribbed or serrated surface.

Because pilings may have various diameters or obstacles may be attached to the pilings causing the elongate piling bracket members to spread apart differently at one piling then that at the previous installation, bumper guard support member(s) are preferably provided with means for adjustable engagement with the elongate piling bracket members. This can be done with at least one slotted aperture for adjustable alignment with and fastening to the generally planar surface of the elongate piling bracket members. Typically, one side of the bumper guard support member(s) simply has apertures for attaching bolts or screws into or through one of the elongate piling bracket members while the other side of the bumper support member(s) has one or more slotted apertures through which a bolt or screw can be inserted through or into the opposite elongate piling bracket member.

The means for securing the elongate piling bracket members to the round piling is preferably made such that it is readily detachable for facilitating the portability of the fender bracket.

One method of providing further adjustment to fender bracket is to incorporate with the means for securing the elongate bracket members, band means which are typically made in two parts or portions. At the end of each portion where the band means meet would be adjustable engagement means. For example, a T-bolt clamp type arrangement can be incorporated where a nut, preferably a wing nut, engages a threaded bolt at the end of the opposite band or strap. The length of the threaded engagement defines the extent of adjustment possible. A wing nut is preferred to facilitate a person manually disassembling or assembling the fender bracket. For stability reasons, it is preferable that at least two band means be used. Of course, there are also several other means known in the art for facilitating tensioning and at the same time facilitating the ease of assembly and disassembly, some which may be considered quick-connect and quick-disconnect hardware.

BRIEF DESCRIPTION OF THE DRAWINGS

For a fuller understanding of the nature and objects of the invention, reference should be made to the following detailed description, taken in connection with the accompanying drawings, in which:

FIG. 2 is a plan view of the present invention on a piling;

FIG. 3 is an elevation view of the present invention depicting a plurality of bumper guard support members;

DETAILED DESCRIPTION OF THE INVENTION

Figure 1:
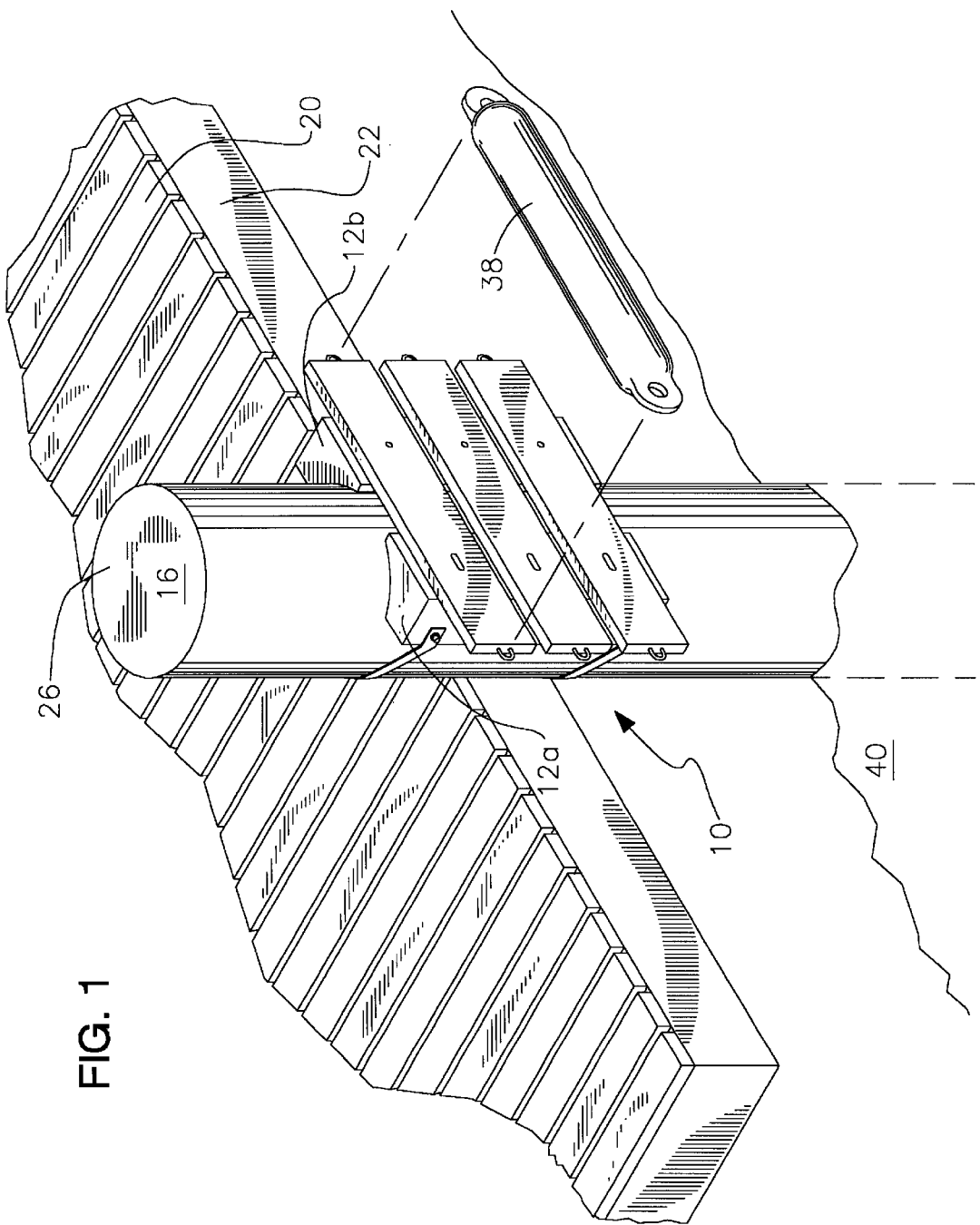
FIG. 1 is a perspective diagrammatic view of the present invention installed on a dock piling.

Referring now to the drawings, in particular FIGS. 1–4, the invention which is a fender bracket for a round piling, depicted generally as 10, includes two elongate piling bracket members 12a,12b of predetermined length, each elongate piling bracket member 12a,12b having a generally concave-shaped longitudinal side 14a,14b for maintaining a generally contiguous face to face relationship along a length of a round piling 16.

Each elongate piling bracket member 12a,12b also has a generally flat side 18a,18b forming an acute angle 56 with the generally concave-shaped longitudinal side such that when the generally concave-shaped longitudinal side 14a, 14b for each elongate piling bracket member 12a,12b is placed on the round piling 16 to which the dock 20 is attached, the generally flat side 18a,18b for each elongate piling bracket member 12a,12b substantially align with each other and a dock's edge 22 and face away from said dock's edge 22.

Means 24 for securing the elongate piling bracket members 12a,12b to the round piling 16 are provided. The means 24 for securing the elongate piling bracket members 12a,12b to the round piling 16 typically has means 24a proximate each end 12c,12d,12e,12f of the elongate piling bracket members 12a,12b as shown in FIG. 3 for securing band means 24b extending from each end 12c,12e of one of the elongate piling bracket members 12a around a backside 26 of the round piling 16 to a corresponding opposite end 12d,12f of the other elongate piling bracket member 12b. The band means 26 is preferably a serrated band for providing a rotational frictional resistance against the surface of the round piling 16.

As noted above, one method of providing further adjustment to fender bracket 10 is to incorporate with the means for securing the elongate bracket members, band means 24b which are typically made in two parts or portions. At the end of each portion where the band means 24b meet would be adjustable engagement means as depicted in FIG. 2, 24c. For example, a T-bolt clamp type arrangement can be incorporated where a nut, preferably a wing nut, engages a threaded bolt at the end of the opposite band or strap. The length of the threaded engagement defines the extent of adjustment possible. A wing nut is preferred to facilitate a person manually disassembling or assembling the fender bracket 10. For stability reasons, it is preferable that at least two band means 24b be used. Of course, there are also several other means known in the art for facilitating tensioning and at the same time facilitating the ease of assembly and disassembly, some which may be considered quick-connect and quick-disconnect hardware.

The present invention 10 also includes at least one bumper guard support member 28 of predetermined height 30a and of predetermined width 30b at least equal to a combined width 30c of the round piling 16 and the two elongate piling bracket members 12a,12b when the fender bracket 10 is installed on a piling 16. The at least one bumper guard support member 28 further has means 32 for securing the at least one bumper guard support member 28 to each of the elongate piling bracket members 12a,12b.

The at least one bumper guard support member 28 has a generally planar surface 34 such that when the at least one bumper guard support member 28 is attached to the elongate piling bracket members 12a,12b, the generally planar surface 34 substantially aligns with the dock's edge 22 and faces away from said dock's edge 22.

Means 36 for securing at least one bumper guard 38 to the generally planar surface 34, in a longitudinal orientation generally parallel to a water surface 40, is also provided. Typically, apertures or eyelets 52 are incorporated at or near the ends of the bumper guard support members 28 so that the bumper guard(s) 38 may be tied to the support members 28.

Figure 5:
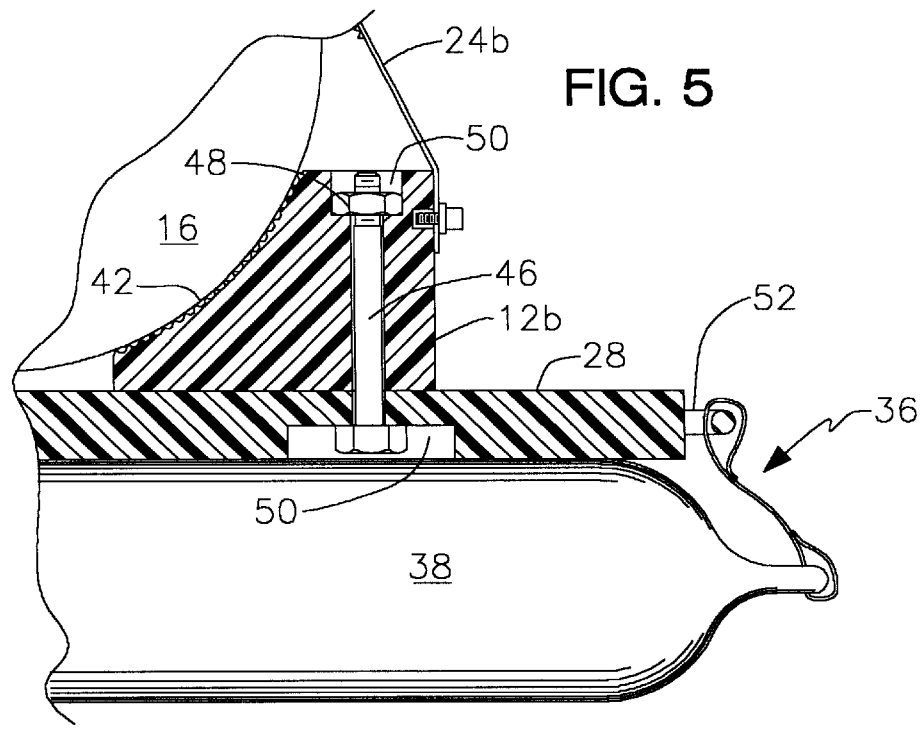
FIG. 5 is an exploded view of a typical fastening of the bumper guard support member to one of the elongate piling bracket members and a typical fastening of one end of a bumper guard to an end or edge of the bumper guard support member.

The generally concave-shaped longitudinal side 14a,14b for each of the elongate piling bracket members 12a,12b may have means 42 for gripping the round piling 16, such as a ribbed or serrated surface as shown in FIG. 5.

Because pilings 16 may have various diameters or obstacles may be attached to the pilings 16 causing the elongate piling bracket members 12a,12b to be spread apart differently at one piling then that at the previous installation, bumper guard support member(s) 28 are preferably provided with means 44 for adjustable engagement with the elongate piling bracket members 12a,12b. This can be done with at least one slotted aperture 54 for adjustable alignment with and fastening to the generally planar surface 34 of the elongate piling bracket members 12a,12b. Typically, one side of the bumper guard support member(s) 28 simply has apertures 52 for attaching bolts or screws into or through one of the elongate piling bracket members 12a,12b while the other side of the bumper support member(s) 28 has one or more slotted apertures 54 through which a bolt or screw can be inserted through or into the opposite elongate piling bracket member 12a,12b.

The means 24 for securing the elongate piling bracket members 12a,12b to the round piling 16 is preferably made such that it is readily detachable for facilitating the portability of the fender bracket 10.

The fender bracket 10 main structural components comprising the elongate piling bracket members 12a,12b and the bumper guard support member(s) 28 may be made from several materials, including wood, metal, high impact polymeric materials including polyvinyl chloride materials and fiber-reinforced polymeric materials, and combination thereof. The means 36 for securing the bumper guards 38 to the bumper guard support member(s) 28 may be integral apertures nears the outside edges of the bumper guard support member(s) 28 or may be eye-screws fastened to the outside edges. Of course, several other methods known in the art may be utilized to attach the bumper guards 38.

If bolts are used to attach the bumper guard support member(s) 28 to the elongate piling bracket members 12a, 12b, it may be advisable to incorporate countersinks and bore 50 as shown in FIG. 5 through which a bolt 46 may be inserted and fastened using nut 48. A countersink provision can hide the bolt head and/or provide a nut locking means for easier assembly of the fender bracket 10 components 12a,12b and 28.

The fender bracket 10 may be attached to the piling 16 by wrapping the means 24 for securing the elongate piling bracket members around the backside 26 of the piling 16 with a band 24b. The band 24b may be a flat strap-like or even a rope or a chain. It is preferable that band 24b be serrated on the inside surface. The band may be a metallic strap with apertures similar to duct strap, in which the fastener can be placed through the aperture into the bracket member 12a,12b. If metal material is used, it is recommended that it be corrosive resistant material such as stainless steel or a zinc-nickel-brass-bronze-aluminum combination, particularly, if the dock is in salt water. The band may also be a canvass-like strap, preferably nylon reinforced. It is also advisable to incorporate a quick disconnect and adjustable tension detachable connection to facilitate the portability of the fender bracket 10.

Again, as noted above, the band means 24b can be made in two parts or portions. At the end of each portion where the and means 24b meet would be adjustable engagement means as depicted in FIG. 2, 24c. The T-bolt clamp type arrangement can be incorporated where a nut, preferably a wing nut, engages a threaded bolt at the end of the opposite band or strap. A wing nut is preferred to facilitate a person manually disassembling or assembling the fender bracket 10. For stability reasons, it is preferable that at least two band means 24b be used. Of course, there are also several other means known in the art for facilitating tensioning and at the same time facilitating the ease of assembly and disassembly, some which may be considered quick-connect and quick-disconnect hardware.

Figure 4:
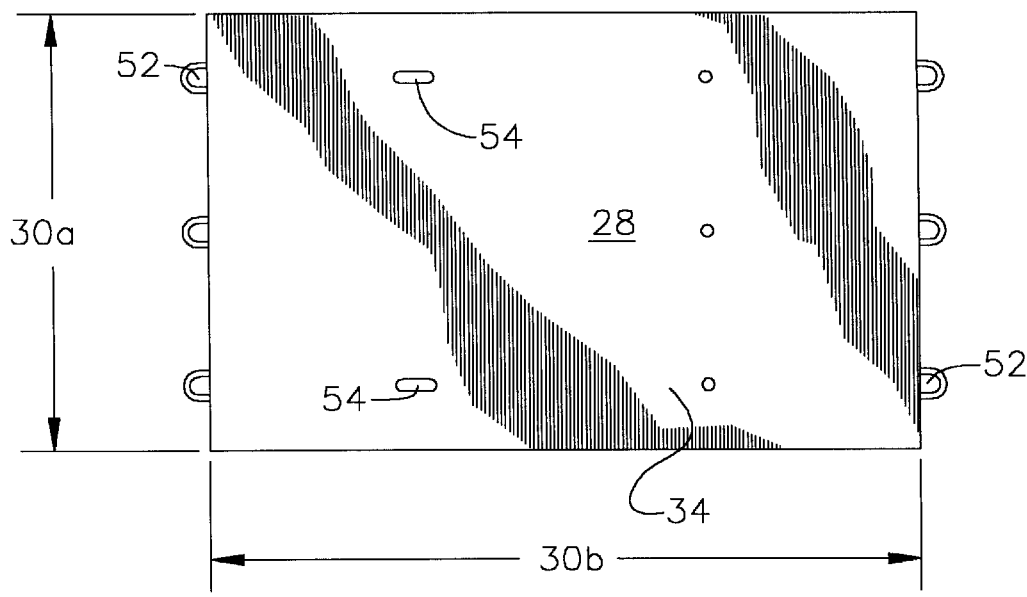
FIG. 4 is an elevation view of an alternative single bumper guard support member for use with the present invention in lieu of the multiple bumper guard support members.

Although a plurality of bumper guard support member(s) 28 may be used as shown in FIG. 3, it is anticipated that the simplest combination of components will incorporate a single sheet member as shown in FIG. 4. The bumper guards 38 are typically attached in the usual customary manner with ropes extending from each end of the bumper guards 38 to the corresponding attachment points 36 in the bumper guard support member(s) 28.

As seen from the foregoing description, the present invention satisfies a long felt need to provide a fender bracket for use with a round piling that can be permanently mounted or mounted for portability. The invention can be easily removed from one piling, compactly stored aboard a boat, and easily installed with minimal tools at the next docking site with a round piling. Further, the invention can be used for larger commercial vessels as well as for small and large recreational boats.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A fender bracket for a round piling comprising:
   two elongate piling bracket members of predetermined length, each elongate piling bracket member having a generally concave-shaped longitudinal side for maintaining a generally contiguous face to face relationship along a length of a round piling;
   each elongate piling bracket member further having a generally flat side forming an acute angle with the generally concave-shaped longitudinal side such that when the generally concave-shaped longitudinal side for each elongate piling bracket member is placed on the round piling, the generally flat side for each elongate piling bracket member substantially align with each other and a dock's edge and face away from said dock's edge;
   means for securing the elongate piling bracket members to the round piling;
   at least one bumper guard support member of predetermined height and of predetermined width at least equal to a combined width of the round piling and the two elongate piling bracket members when attached to the round piling, the at least one bumper guard support member further having means for securing said at least one bumper guard support member to each of the elongate piling bracket members;
   the at least one bumper guard support member having a generally planar surface such that when the at least one bumper guard support member is attached to the elongate piling bracket members, the generally planar surface substantially aligns with the dock's edge and faces away from said dock's edge; and
   means for securing at least one bumper guard in a longitudinal orientation generally parallel to a water surface.

2. The fender bracket according to claim 1, wherein the generally concave-shaped longitudinal side for each of the elongate piling bracket members has means for gripping the round piling.

3. The fender bracket according to claim 2, wherein the means for gripping the round piling is a ribbed surface.

4. The fender bracket according to claim 1, wherein the means for securing the elongate piling bracket members to the round piling comprises:
   means proximate each end of the elongate piling bracket members for securing band means extending from each end of one of the elongate piling bracket members around a backside of the round piling to a corresponding opposite end of the other elongate piling bracket member.

5. The fender bracket according to claim 4, wherein there are at least two band means.

6. The fender bracket according to claim 5, wherein each band means is a serrated band for providing a rotational frictional resistance against the surface of the round piling.

7. The fender bracket according to claim 5, wherein each band means is made from two band means portions and includes adjustment means for tensioning the band means.

8. The fender bracket according to claim 7, wherein said adjustment means further being means for assembling and disassembling the fender bracket from the round piling thereby facilitating the portability of the fender bracket.

9. The fender bracket according to claim 1, wherein the at least one bumper guard support member has means for adjustable engagement with at least one of the elongate piling bracket members.

10. The fender bracket according to claim 9, wherein the means for adjustable engagement with at least one of the elongate piling bracket members is at least one slotted aperture for adjustable alignment with and fastening to the generally planar surface of the elongate piling bracket members.

11. The fender bracket according to claim 1, wherein the means for securing the elongate piling bracket members to the round piling is detachable for facilitating the portability of the fender bracket.

\* \* \* \* \*